Oct. 30, 1962 G. A. REYNOLDS 3,060,601
EARTH MOVING APPARATUS
Filed Sept. 20, 1960 4 Sheets-Sheet 1
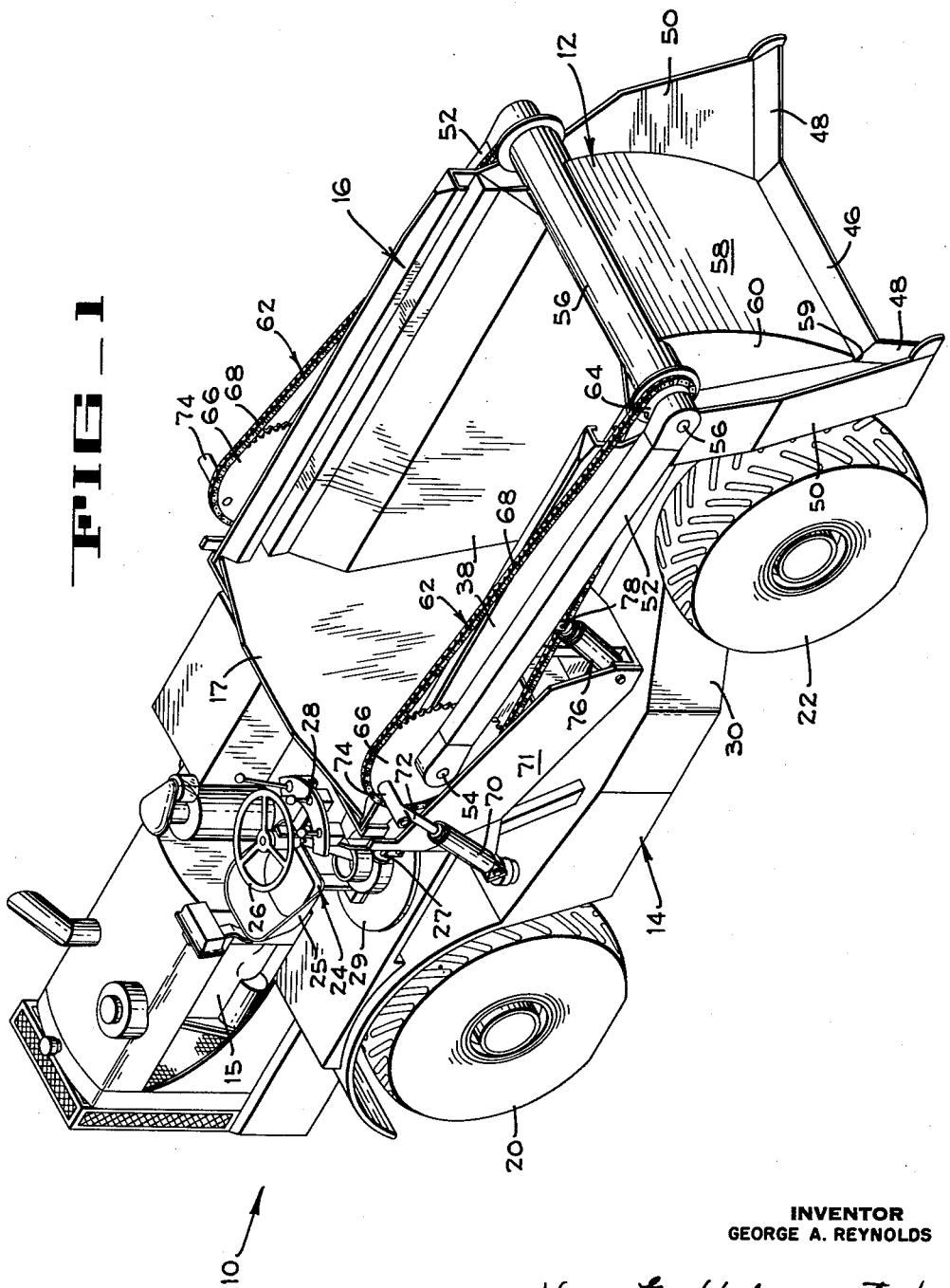
INVENTOR
GEORGE A. REYNOLDS
BY *Hans G. Hoffmeister*
ATTORNEY

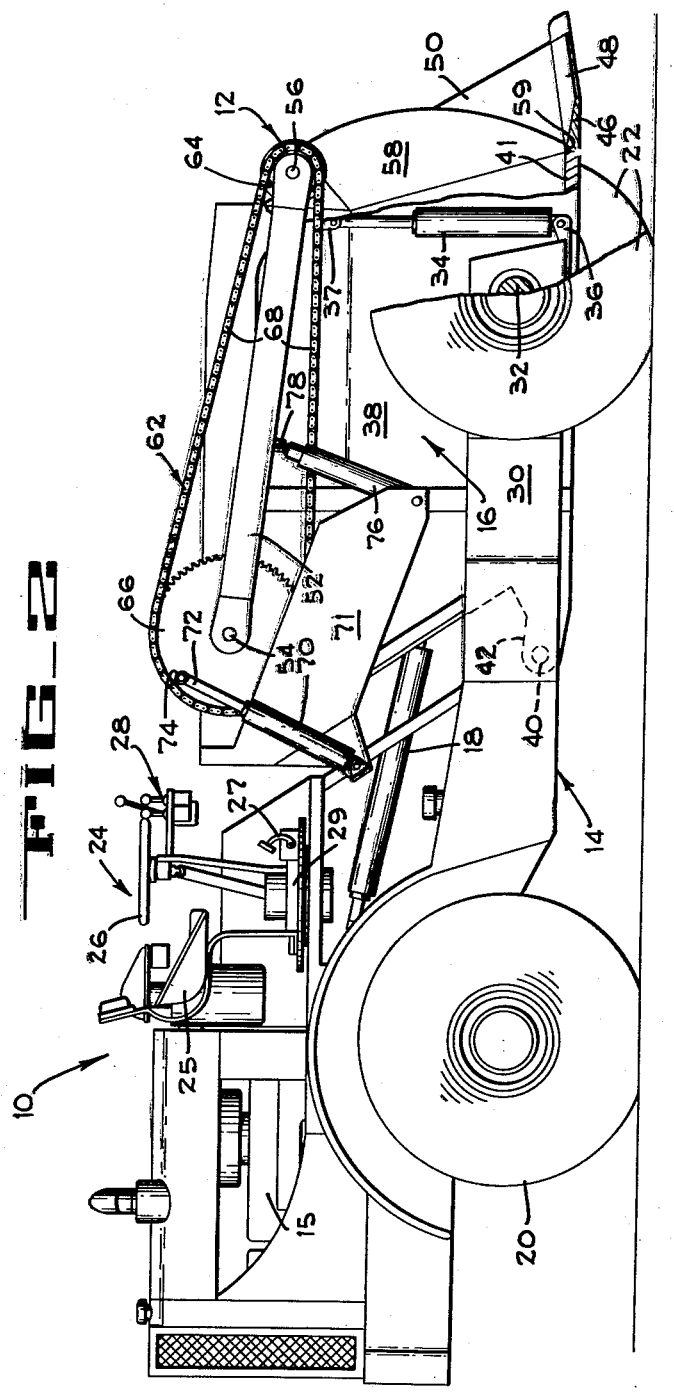

Oct. 30, 1962 G. A. REYNOLDS 3,060,601
EARTH MOVING APPARATUS
Filed Sept. 20, 1960 4 Sheets-Sheet 3
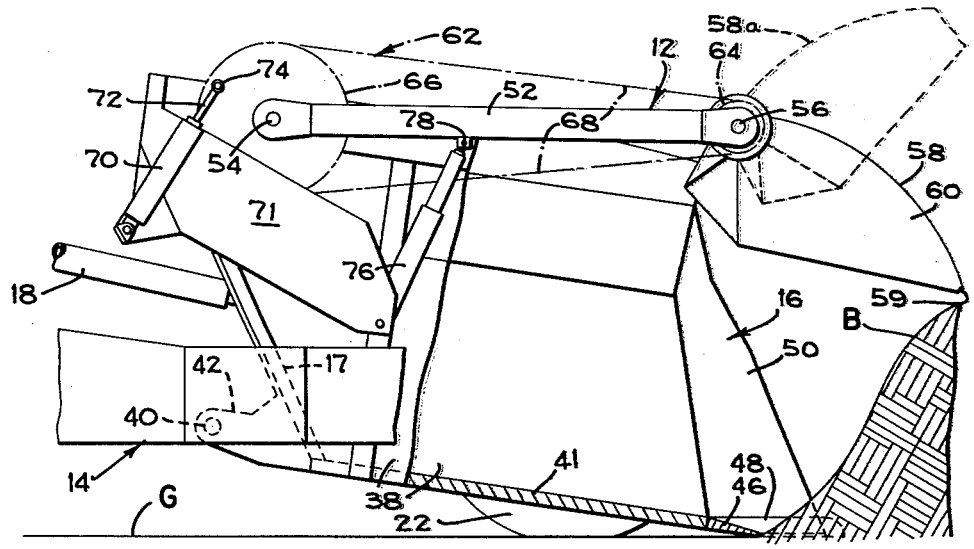
FIG_3
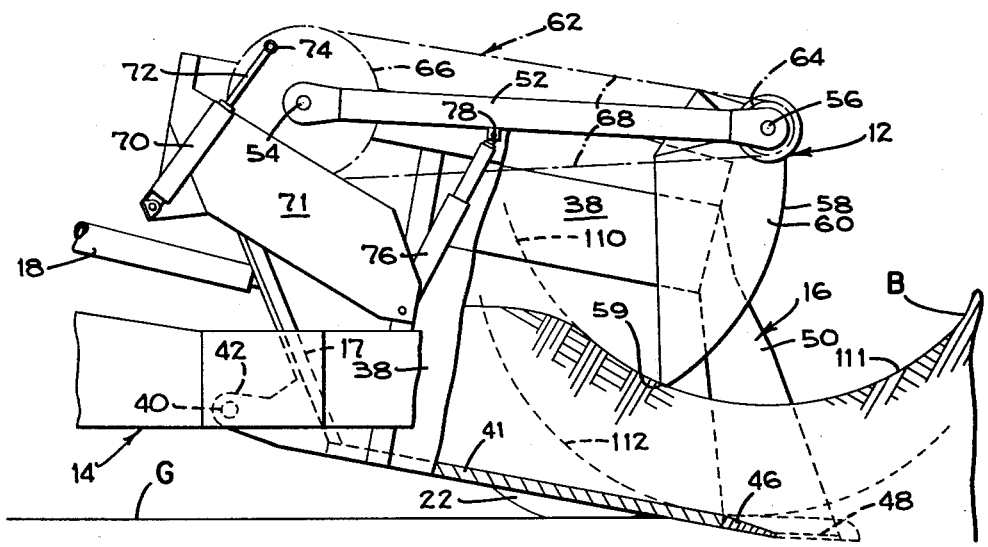
FIG_4
INVENTOR
GEORGE A. REYNOLDS
BY *Hans G. Hoffmeister*
ATTORNEY Oct. 30, 1962 G. A. REYNOLDS 3,060,601
EARTH MOVING APPARATUS
Filed Sept. 20, 1960 4 Sheets-Sheet 4
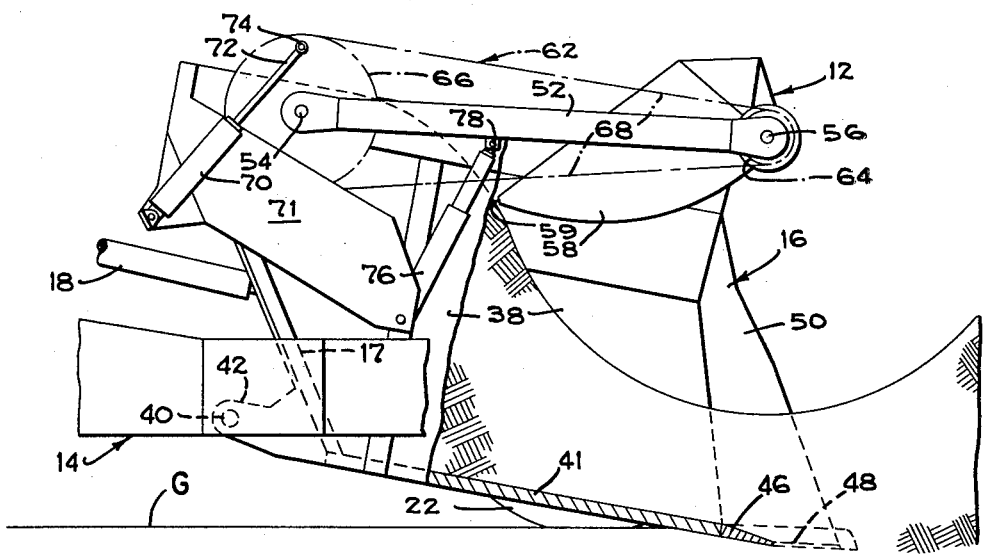
FIG_5
FIG_6
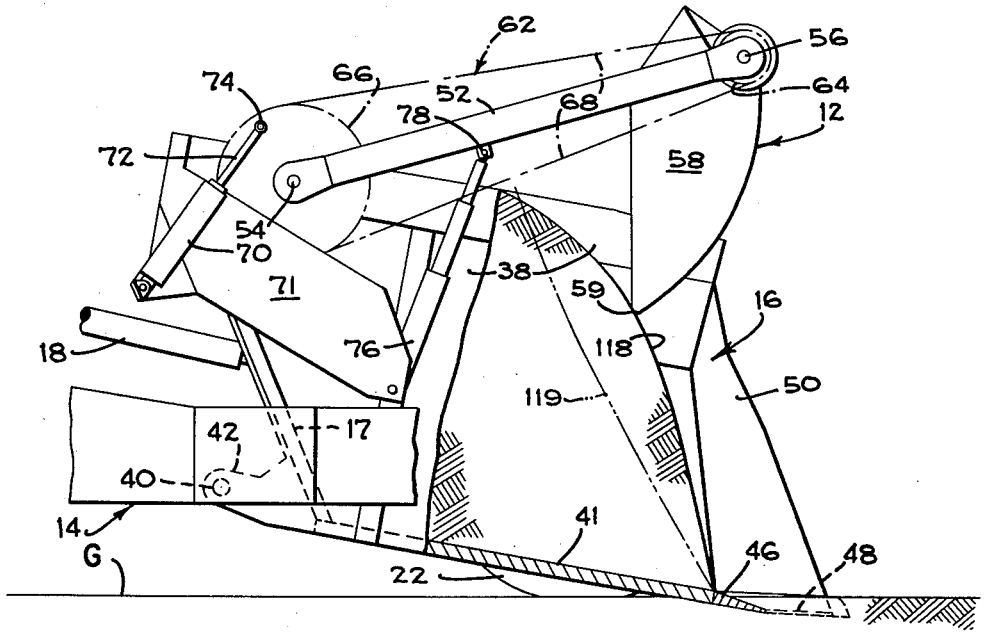
INVENTOR
GEORGE A. REYNOLDS
BY Hans G. Hoffmeister
ATTORNEY United States Patent Office 3,060,601
Patented Oct. 30, 1962

3,060,601
EARTH MOVING APPARATUS
George A. Reynolds, San Jose, Calif., assignor to FMC Corporation, a corporation of Delaware
Filed Sept. 20, 1960, Ser. No. 57,191
5 Claims. (Cl. 37—126)

The present invention pertains to earth moving apparatus and more particularly relates to an improved loading means for a scraper-type earth moving vehicle.

The major problem of very large capacity self-propelled earth moving vehicles which use a scraper action to cut and load material into a storage hopper by the movement of the vehicle into a pile of earth or the like, is that of utilizing the full capacity of the hopper. This problem occurs because it is impractical to employ, in a large capacity earth mover, an engine so powerful that the movement alone of the vehicle will force enough material into the hopper to completely fill it. It is therefore common to employ additional vehicles to push the earth moving vehicle or to use a power driven loading apron mounted on the vehicle to move the material which is scraped back into the hopper as it is cut.

The present invention provides an improved power driven loading blade, or apron, for a scraper-type earth moving vehicle, the apron being effective to rake the cut earth into the vehicle's hopper while the vehicle is moving or stopped.

Accordingly, an object of the present invention is the provision of an improved power driven loading apron for an earth moving vehicle.

Another object of the present invention is the provision of an improved scraper vehicle loading apron which is reciprocable in an arcuate path extending diagonally in a longitudinal direction over the bottom of the earth storing hopper of the vehicle.

These and other objects and advantages of the present invention, will become apparent from the following description and from the accompanying drawings, in which:

FIGURE 1 is a more or less schematic perspective of an earth moving vehicle employing the improved loading apron of the present invention.

FIGURE 2 is a schematic side elevation with portions broken away, of the earth moving vehicle illustrated in FIGURE 1.

FIGURE 3 is a schematic fragmentary elevation of the cooperating hopper and loading apron of the vehicle shown in FIGURE 1, illustrative of the beginning of an earth loading operation.

FIGURES 4, 5, and 6 are schematic fragmentary elevations similar to FIGURE 3 and showing successive operational views of the loading apron of the present invention.

The earth moving vehicle 10 (FIGS. 1 and 2) of the present invention is provided with an improved integral loading mechanism 12, and includes a frame structure 14, which supports an engine 15 and an open end rearwardly facing hopper or bowl 16. The forward or closed end of the bowl 16 is formed by an ejector plate or wall 17 that is movable to push out the contents of the bowl by means of a parallel pair of telescoping hydraulic cylinders 18, only one of which is shown.

The vehicle 10 is supported upon front pneumatic steering wheels 20 and upon rear pneumatic wheels 22, all of which are driven from the engine 15, by a drive train not shown, and controlled from an operator's station 24. Included at the operator's station 24 is a seat 25, a steering wheel 26, and the usual braking and accelerating controls at 27. A group of hydraulic controls, indicated generally at 28, actuate various hydraulic mechanisms which will be described presently. All of the controls at 28 and the operator's seat 25 are mounted upon a control turret 29 which is rotatable to any desired position by the operator. The controls 28 are effective in any position of the turret, which thus facilitates rapid movement of the vehicle since the vehicle operator can directly view any of the many possible varied operations while the vehicle moves in either a forward or a reverse direction.

A side rail 30 (FIG. 2) of the frame 14 supports each of the rear wheels 22 by means of an outwardly projecting driven stub-axle 32. Only one such frame rail 30 and stub-axle 32 is shown, but it will be understood that the far rail, axle and other associated parts are identical, but oppositely disposed, to the ones illustrated.

From a position rearward of the approximate midlength of the frame 14, no interconnecting members are provided between the side rails 30 so that the scraper bowl 16 is free for vertical movement between the rails, to and from engagement with the ground. To effect the vertical movement of the bowl, each frame side rail 30 is provided with a double acting hydraulic cylinder 34 which is pivotally mounted to a bracket 36 that is fixed to the rear end portion of the rail, the piston rod of the cylinder being secured to a bracket 37 which is fixed to a side wall 38 of the scraper bowl 16.

Upon actuation of one of the hydraulic controls at 28, the two cylinders 34 are simultaneously actuated to raise or lower the scraper bowl 16 in a pivotal movement around inwardly projecting stub shafts 40 that are secured one to each side rail 30. Each shaft 40 is journalled in a bracket 42 which is secured to the adjacent wall 38 of the scraper bowl 16. When the piston rods are retracted in the cylinder 34, the scraper bowl 16 pivots around the shafts 40 and the rearmost edge of a bottom wall 41 of the bowl engages the ground. In order to regulate the depth of the scraping cut, the bowl may be lowered by means of the hydraulic cylinders 34 until the edge of the bottom wall 41 is at any elevation from about 11 inches above grade to about 6 inches below grade.

The rearmost edge of the bottom wall 41 of the scraper bowl is reinforced by a hardened steel cutting bar 46 which is coplanar with the bottom wall 41 of the bowl and digs or scrapes earth into the inclined scraper bowl upon rearward movement of the vehicle. Outwardly flared extension bars 48 (FIG. 1) extend the effective cutting width of the bar 46 wider than the track of the vehicle so that the wheels 20 and 22 will not be obstructed by uncut earth as the vehicle 10 progresses rearwardly. An inwardly flared guide wall 50 is connected to each bar 48 and to the associated side wall 38 of the scraper bowl 16 in order to guide the cut earth into the bowl when the vehicle is operating.

It will be seen that, when the scraper bowl 16 is lowered into scraping or cutting engagement with the ground, and the vehicle is set in motion to scrape up earth with the cutting bar 46, the power requirements will progressively increase if the vehicle scrapes up earth only by the force of rearward movement of the vehicle because successive cuts of earth must push away the earth already in the bowl.

Since the capacity of the scraper bowl 16 is quite large, the power available from the engine 15 might not be sufficient to cause the bowl to be completely filled if the material being scraped or dug is hard and compacted. The scraper loading action is thus supplemented by the improved loading mechanism 12 of the present invention, in order that the cut material may be expeditiously loaded and that the large capacity of the scraper bowl 16 may be most advantageously used.

The loading mechanism 12 includes two apron mounting arms 52 (FIG. 1) each of which extends rearwardly from a pivot shaft 54 (FIG. 2) that is secured near the front upper corner of one of the side walls 38 to the scraper bowl 16. The free ends of the apron mounting arms 52 carry a transversely extending rotatable loading apron driveshaft 56 above the rear end portion of the bowl 16, and a generally scooped-shaped loading apron 58 is fixed to the driveshaft 56 for rotation therewith.

The loading apron 58 is provided with a sharpened free edge 59 and side walls 60, only one being shown, each of which lies in a vertical plane disposed close to an adjacent side wall 38 of the scraper bowl 16. The loading apron 58 is therefore adapted to seal off the open end of the scraper bowl 16 when positioned as illustrated in FIGURES 1 and 2.

The angular position of the driveshaft 56 is controlled by two power actuated drive trains 62 (FIG. 1), one drive train being disposed alongside each side wall 38 of the scraper bowl 16, and both drive trains being arranged for synchronous movement. Each drive train 62 includes a sprocket 64 which is fixed on a reduced diameter end portion of the driveshaft 56, a freely rotatable sprocket 66 mounted on the pivot shaft 54 alongside the apron mounting arm 52, and a roller chain 68 which is trained around the sprockets 64 and 66. The drive ratio of the sprocket 66 to the sprocket 64 is approximately 3 to 1, for a reason which will be made clear hereinafter.

The angular position of each sprocket 66 is adjustable by means of a double-acting hydraulic loading apron cylinder or ram 70, the base of which is pivotally mounted on a bracket 71 that is secured to the adjacent wall 38 of the bowl 16. A piston rod 72 of each hydraulic cylinder 70 (one for each drive train 62) is connected to an arm 74 that is rotatably mounted on the sprocket 66 and projects outwardly therefrom in a position offset from the pivot 54. It will accordingly be apparent that actuation of the two cylinders 70 by means of one of the hydraulic controls at 28 will cause rotation of the sprockets 64 and of the loading apron driveshaft 56. The particular angular disposition of the loading apron 58 is in this manner governed by the hydraulic cylinders 70.

Each apron mounting arm 52 is arranged to be elevated from the lowermost position of the arm 52 (FIG. 2), by means of a double-acting hydraulic cylinder or ram 76 of the telescoping type. The base of each cylinder 76 is pivotally mounted to the bracket 71 and the end of the piston rod is provided with a pivotal connection to a depending strap of the apron arm as seen at 78. It will be understood that the hydraulic lines to the cylinders 70 and 76 illustrated are connected in parallel to the hydraulic lines for the other two cylinders 70 and 76 that are not illustrated. Since the cylinders 70 and 76 at each side of the vehicle are interconnected, the loading blade is rotated by simultaneous actuation of the two drive trains 62 and lifted or lowered by a simultaneous actuation of the hydraulic cylinders 76.

It will be seen that any pivotal movement of the apron mounting arms 52, when the sprockets 66 are stationary, will cause a rotation of the apron driveshaft 56, and the loading apron 58 secured thereto, in a clockwise direction as viewed in the accompanying drawings.

When the earth moving vehicle 10 is put into operation to dig earth from below the natural grade G (FIG. 3), but where there exist elevated banks of very hard compacted earth or rock, the scraper bowl 16 is caused to be lowered into engagement with the ground by actuation of one of the hydraulic controls at 28 which effects simultaneous retraction of the piston rods of the hydraulic cylinders 34. The cutting bars 46 and 48 on the rear end of the scraper bowl 16 are thus forced into cutting engagement with the ground. The operator then moves the control which causes the piston rods 72 of the cylinders 70 to be retracted until the loading apron 58 pivots to a point wherein it is higher than a bank B of the material against which the vehicle is to be moved. If pivoting the apron does not elevate the apron sufficiently, the arms 52 may also be raised by means of the hydraulic cylinders 76.

The vehicle 10 is then moved rearwardly (FIG. 4) and the open end of the scraper bowl 16 is forced into the earth. Either after or before the cut earth is moved into the scraper bowl, the loading apron 58 is put in motion by means of an actuation of the cylinders 70 through the controls previously mentioned, in order to effect a pivotal reciprocation of the apron so that its free end follows the path seen at 110. The loading apron thus cuts away earth from the bank B, as seen at 111. Also, the earth in the bowl 16 is scooped up by the apron during its arcuate stroke and forced forwardly to fill the closed end portion of the bowl.

If the vehicle 10 is scraping earth from a more or less level location, the loading apron may be set in motion in the same manner above mentioned while the arms 52 are in the lowered position shown in FIGURE 2. The free end of the apron will then follow the path 112 (FIG. 4) and a similar loading action occurs in that the earth cut by the cutting bars 46 and 48 is moved to the closed front end of the scraper bowl 16.

In either event, whether the loading apron is set in motion from a lowered or an elevated position, when the apron reaches the extent of its rearward arcuate movement toward the closed end of the scraper bowl 16 (FIG. 5) the apron mounting arms 52 must be elevated slightly before the apron 58 is returned to the position of FIGURE 4 to begin again the same loading action. Obviously, variations of the above described loading operation may be used when manipulating the loading blade to rip out stumps, move boulders, or other such specialized operations.

Another movement of the loading apron 58 may be caused by elevating and lowering the loading apron arms 52 (FIG. 6) by the cylinders 76 while the sprockets 66 are held in fixed position by the cylinders 70. In this way, the positions of the driveshaft sprockets 64 change in relation to the sprockets 66, as the arms 52 are moved, due to the size difference of the sprocket 66 and the driveshaft sprocket 64. The arm movement causes rotation of the loading blade shaft 56 to which the drive shaft sprocket 64 is attached and causes the lower edge of the loading apron to follow an arcuate path substantially as indicated at 118. The material scraped into the bowl 16 is thus moved upwardly and rearwardly to effect a filling of the scraper bowl 16 toward its closed end.

It will be apparent that different ratios of the sprockets 66 and 64 may be used to obtain movement of the loading apron 58 in paths different from the ones illustrated. For example, the loading apron 58 might be moved so that its sharpened edge 59 follows another desirable path such as a linear path diagonally upward in the bowl, or an arcuate path 119 (FIG. 6) which is opposite to the one illustrated. Both of these movements will fill the closed end of the bowl and might be specifically suited to particular materials to be loaded. The loading motion illustrated in FIGURE 6 is of special utility when the scraper bars 46 and 48 are making a scraping cut slightly below natural grade and the vehicle is not moving against an elevated bank of hard-to-cut material. If a bank is composed of gravel, sand or a similar relatively loose material, the just described loading action may be used even though the material is in a large pile since the downward driving force of the loading apron is powerful enough to easily cut and load any but a very hard compacted material, such as rock, paving, and the like.

In addition to the motions described for the loading aprong 58, another specialized motion provided for is movement to the elevated position of the apron such as is seen in phantom lines at 58a (FIG. 3). This, and even more elevated positions, are attainable by means of the previously mentioned controls and the particular use of this and similar elevated positions is to enable the loading apron 58 to make overhead cuts with the sharpened edge 59, such as in a mine gallery, or for tunneling.

When the scraper bowl 16 has been loaded, the operator may pivot the control turret 29 to face the front of the vehicle if the distance to the dumping site is very long. In actual practice, the operator usually rotates the turret and locks it so that he faces one side of the vehicle for all operations, in which position he can comfortably see in either direction and may thereby speed up the loading and discharging operations by not stopping to position the turret for each change in vehicle direction.

At the dumping site the scraper bowl 16 is emptied by raising the apron 48 to open the rear end of the bowl, and actuating one of the hydraulic controls at 28 to extend the piston rods of the telescope-type hydraulic cylinders 18. The bases of these cylinders are pivoted to a fixed part of the frame 14 and the piston rod ends are pivoted to the ejector plate 17. The ejector plate 17 is thus moved rearwardly to a position adjacent the cutting bar 46 and all of the material in the scraper bowl is forcibly ejected. The ejector plate is provided with guide means, not shown, that maintain the angular position of the blade during its movement along the scraper bowl floor 41.

Another function of the loading apron 58 is that of an adjustable gate to control the flow of material from the bowl when the vehicle is used as a spreader. In a spreading operation, the vehicle may be moved either forwardly or rearwardly with its scraper bowl inclined downwardly from the pivot shafts 40 by means of the hydraulic cylinders 34. The material in the bowl will graviate over the cutting bar 46 and the flow of material may be regulated by adjusting the sharpened edge 59 of the loading apron 48 to any desired position above the cutting bar 46.

When bulldozing with the vehicle, it is preferable to first fill the scraper bowl 16 so as to increase the traction of the vehicle and to provide a backing resistance to the loading apron 58 if the work to be done is unusually heavy. With the apron 58 in the position illustrated in FIGURES 1 and 2, the vehicle can then efficiently perform all the usual functions of a conventional bulldozer.

From the foregoing description, it will be apparent that the earth moving vehicle of the present invention is adapted to cut and load earth, or other material adjacent the open end of the scraper bowl 16, independently of the scraper loading action produced by the rearward movement of the vehicle 10. This separate cutting and loading action of the loading apron 58 is of notable utility since it permits loading the scraper bowl 16 in a manner which uses to advantage the large capacity of the bowl.

It will furthermore be apparent that the improved earth moving vehicle 10 of the present invention is a general duty, large capacity earth moving machine which combines the utility of many separate specialized vehicles into one rugged and efficient multi-purpose vehicle. Furthermore, this has been attained not by sacrificing any desirable features of the separate machines which the vehicle of the present invention replaces, but on the contrary, by providing as much, or even greater, flexibility and utility in each of the varied operations of the vehicle.

While a particular embodiment of the present invention has been shown and described, it will be understood that the earth moving vehicle 10 is capable of modification and variation without departing from the principles of the invention and that the scope of the invention should be limited only by the scope and proper interpretation of the claims appended hereto.

The invention having thus been described, that which is believed to be new, and for which protection by Letters Patent is desired, is:

1. In an earth moving apparatus, a scraper bowl having a rear earth-receiving opening and a forward portion longitudinally spaced from the opening; an elongated mounting member having a front portion connected to the bowl for elevational pivotal movement about a forward axis extended transversely of the bowl and a rear portion rearwardly extended from said axis; an earth-engaging apron transversely extended within the bowl, rotatably received in the rear portion of the mounting member for rotation about a rear axis in rearwardly spaced substantially parallel relation to the forward axis, and having an earth-scraping edge in transversely spaced relation to said rear axis; a rear sprocket secured to the apron concentrically of the rear axis; a forward sprocket mounted on the bowl concentrically of the forward axis and in coplanar relation with the rear sprocket; and endless chain extended around the sprockets; and powered means connected to the mounting member for pivoting the same about said forward axis thereby to swing the rear axis about the forward axis and, whereby with the forward sprocket held against rotation, the rear sprocket is rotated by the chain to swing the scraping edge of the apron about the rear axis.

2. The apparatus of claim 1 wherein the sprockets have different diameters.

3. The apparatus of claim 1 wherein the rear sprocket is diametrically smaller than the forward sprocket.

4. A power driven, self-loading, earth moving vehicle comprising a frame; an elongated scraper bowl mounted in the frame having a rearwardly directed, earth-receiving opening and an opposite forward portion; an elongated arm having a front end pivotally supported on the bowl for elevational movement of the arm about a substantially horizontal, forward axis extended transversely of the bowl, and having a rear end adjacent to said earth-receiving opening; a forward sprocket rotatably mounted on the bowl concentrically of the forward axis; powered means pivotally interconnecting the bowl and the forward sprocket for rotating the forward sprocket about the forward axis and for holding the forward sprocket in selected positions of rotation; an apron extended transversely within the bowl having an axis member rotatably received in the rear end of the arm for rotation of the apron about a rear axis substantially parallel to the forward axis, the apron having an earth-scraping edge in transversely spaced relation to the axis member; a rear sprocket secured to the apron concentrically of the rear axis and coplanar with the forward sprocket; an endless chain extended around and in mesh with the sprockets; and powered means pivotally interconnecting the bowl and the arm for concurrently moving the rear axis in an arc concentric to the forward axis and moving the earth-scraping edge in an arc concentric to the rear axis whereby said earth-scraping edge is movable along a path forwardly and rearwardly upwardly extended from the earth-receiving opening of the bowl.

5. An earth moving apparatus comprising a mobile frame; an elongated scrapper bowl borne by the frame having a forward wall, and a pair of transversely spaced side walls rearwardly extended from the forward wall and defining a rear earth-receiving opening therebetween in opposed relation to the forward wall; a pair of arms pivotally mounted on the side walls of the bowl, rearwardly extended therealong, and being elevationally movable about a common, substantially horizontal axis extended transversely of the bowl; an earth-engaging apron rotatably supported by the arms, downwardly extended therefrom between the walls of the bowl, being pivotal about an apron axis in spaced parallel relation to said common axis of the arms, and providing an earth-scraping edge parallel to said apron axis; a forward sprocket rotatably mounted on the bowl concentrically of said common axis; a rear sprocket secured to the apron concentrically of the apron axis and in a substantially common plane with the forward sprocket; a chain extended around and in mesh with the sprockets; a first ram borne by the bowl and connected to the forward sprocket for imparting rotation thereto; and a second ram borne by the bowl and connected to the arms for rotating the arms about their common axis and for simultaneously swinging the scraping edge about the apron axis when the forward sprocket is held against rotation, said forward sprocket being rotatable by said first ram to pivot the apron on said apron axis independently of rotation of said arms.

References Cited in the file of this patent
UNITED STATES PATENTS

| | | |
|---|---|---|
| 1,224,349 | Yessne | May 1, 1917 |
| 1,471,302 | Wright et al. | Oct. 16, 1923 |
| 2,795,872 | Wardle | June 18, 1957 |
| 2,812,595 | Drott | Nov. 12, 1957 |
| 2,844,892 | Carston | July 29, 1958 |